United States Patent [19]

Zubar et al.

[11] Patent Number: 4,897,515

[45] Date of Patent: Jan. 30, 1990

[54] SECURING DEVICE FOR THE SWITCH HANDLE OF A CIRCUIT BREAKER

[75] Inventors: Eduard Zubar; John R. Patrick, Stone Mountain, both of Ga.

[73] Assignee: Siemens Energy & Automation, Inc., Atlanta, Ga.

[21] Appl. No.: 282,154

[22] Filed: Dec. 9, 1988

[51] Int. Cl.4 .......................................... H01M 27/10

[52] U.S. Cl. ............................... 200/43.14; 200/43.11

[58] Field of Search ............... 200/43.11, 43.12–43.15, 200/43.22, 43.16, 43.18, 43.19, 43.21, 318, 328

[56] References Cited

U.S. PATENT DOCUMENTS 4,347,412 8/1982 Mihara et al. .................... 200/43.15

4,488,133 12/1984 McClellan et al. .................. 335/16

*Primary Examiner*—Leo P. Picard

*Assistant Examiner*—Lincoln Donovan

*Attorney, Agent, or Firm*—James G. Morrow

[57] ABSTRACT

An apparatus for locking the switch handle of a circuit breaker in the ON or OFF position. The apparatus includes a blocking member mountable on the handle with two screws, a pivoting member pivotable about the screws and a lock for locking the blocking member to the pivoting member. When the blocking member and the pivoting member are locked together, the blocking member is maintained in a position such that it interferes with the circuit breaker housing and prevents the handle from being moved.

8 Claims, 3 Drawing Sheets

SECURING DEVICE FOR THE SWITCH HANDLE OF A CIRCUIT BREAKER

BACKGROUND OF INVENTION

This invention relates to a circuit breaker and, more particularly, to a handle blocking device for securing the switch handle of a circuit breaker in the ON or OFF position.

Normally, access to the switch handle of a circuit breaker is limited or controlled by housing the circuit breakers in a panelboard/enclosure. By locking the access door of an enclosure, access to the enclosed circuit breakers can be limited to only those person authorized to control the circuit breakers. The circuit breaker of U.S. Pat. No. 4,488,133, which issued on Dec. 11, 1984, is an example of a circuit breaker which may be housed in an enclosure such that its access is limited.

The problem with controlling access to all of the circuit breakers within a single enclosure is that it may be possible or practical that access to all of the circuit breakers be limited. For example, for safety reasons it may be dangerous to limit access to some of the circuit breakers within an enclosure, while it may be important to limit access to the remainder of the circuit breakers within the enclosure. Accordingly, it would be useful to provide a device which restricts the operability of the switch handle of an individual circuit breaker to persons authorized to operate the circuit breaker between its ON and OFF positions.

SUMMARY OF THE INVENTION

The object of the present invention is to provide a means for restricting the operability of the switch handle of individual circuit breakers.

Accordingly, there is provided an apparatus for restricting the movement of the circuit breaker switch handle of a circuit breaker. The apparatus includes: means adapted to interfere with the housing, the means being mounted to the handle; means for attaching the means adapted to the handle; and means for restricting access to the means for attaching, the means for restricting being mounted to the handle. The handle is restrained in the first position when the means adapted to interfere interferes with the housing.

An advantage of the present invention is that is it can be readily retrofitted to existing circuit breakers. Another advantage of the present invention is that it can be used with a standard lock. Another advantage of the present invention is that it is relatively inexpensive to manufacture and requires minimal expense to install on existing circuit breakers.

DETAILED DESCRIPTION OF THE PREFERRED EMBODIMENT

Figure 1:
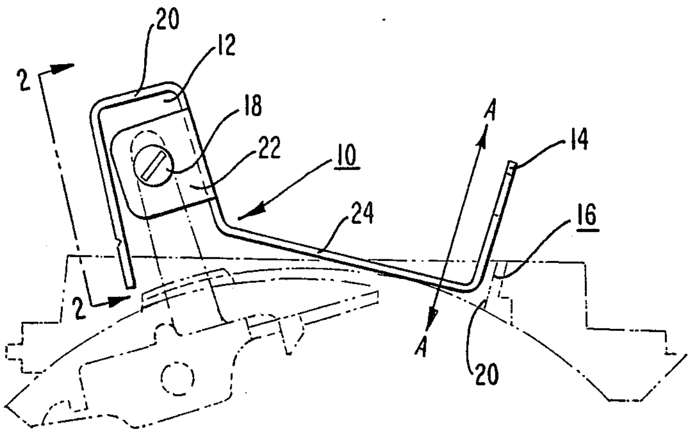
FIG. 1 illustrates a blocking member attached to the switch handle of a circuit breaker.
Figure 2:
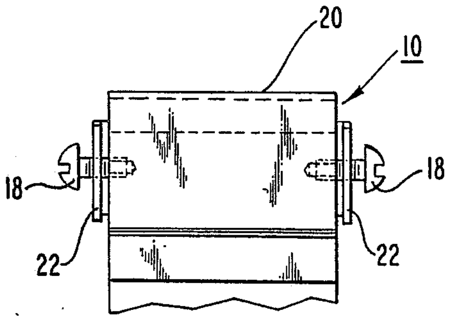
FIG. 2 is a view taken along line 2—2 in FIG. 1.
Figure 3:
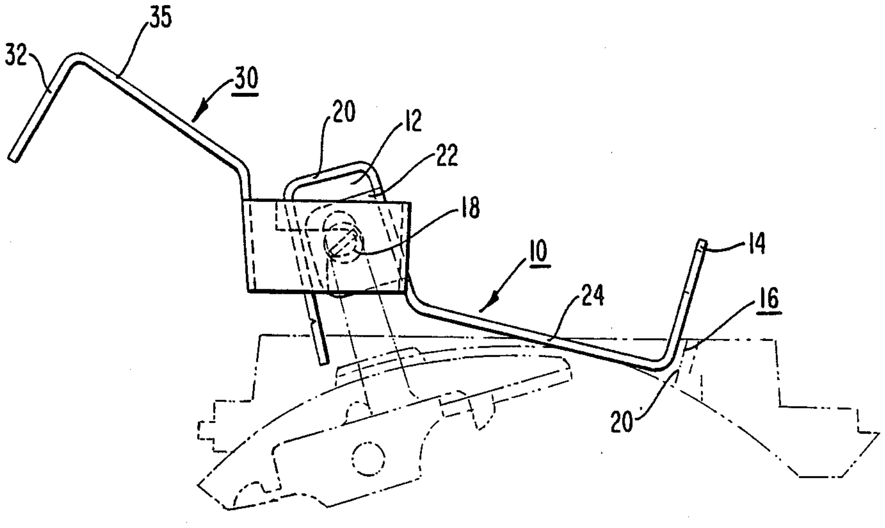
FIG. 3 illustrates the blocking member attached to the switch handle, wherein a locking member is pivotally attached to the switch handle.

Referring now to the drawings, FIG. 1 illustrates a blocking member 10 attached to the switch handle 12 of a circuit breaker with screws 18. For purposes of simplicity, only the portion of the circuit breaker housing adjacent to the switch handle 12 is illustrated. By way of example, the relationship of a circuit breaker switch handle to a complete circuit breaker housing is illustrated in U.S. Pat. No. 4,488,133.

In FIG. 1, the switch handle 12 is positioned in its OFF position. The locking flange 14 of the blocking member 10 is positioned relative to the housing portion 16 such that the switch handle 12 is prevented from moving to its ON position due to the interference between the locking flange 14 and the edge 20 of the housing portion 16.

Figure 6:
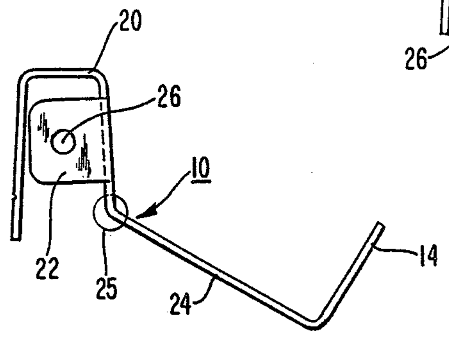
FIG. 6 is a side view to the blocking member.
Figure 7:
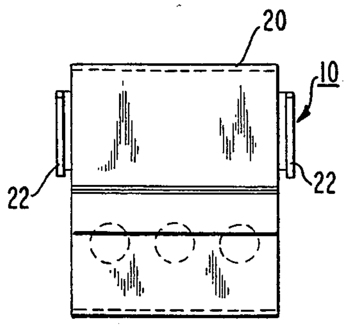
FIG. 7 is an end view of the blocking member.

FIGS. 6 and 7 illustrate the blocking member 10 in more detail. By way of example, the blocking member 10 can be fabricated from a single blank stamped from 15 gauge cold rolled steel. In the preferred embodiment, the blocking member 10 includes a hook member 20, two attachment flanges 22 and a member 24 for supporting the locking flange 14 relative to the hook member 20. The hook member 20 is shaped to have substantially the same contour as the switch handle 12 of a circuit breaker so that the hook member 20 securely straddles the handle 12. The attachment flanges 22 each include an opening 26 adapted to accept the screw 18 such that the blocking member 10 is fixed onto the switch handle 12.

In one embodiment of the apparatus, the switch handle 12 can be moved by removing the blocking member 10 from the switch handle 12. In another embodiment of the apparatus, the switch handle 12 can be moved by deflecting the locking flange 14 upward along line A—A such that the locking flange 14 does not interfere with the housing portion 16. To facilitate the deflection of the locking flange 14, the member 24 can be fabricated from a flexible material, or the member can be pivotally attached to the hook member 20 with a hinge 25. FIG. 6 illustrates the location of the hinge 25 which is shown schematically with a circle.

Figure 4:
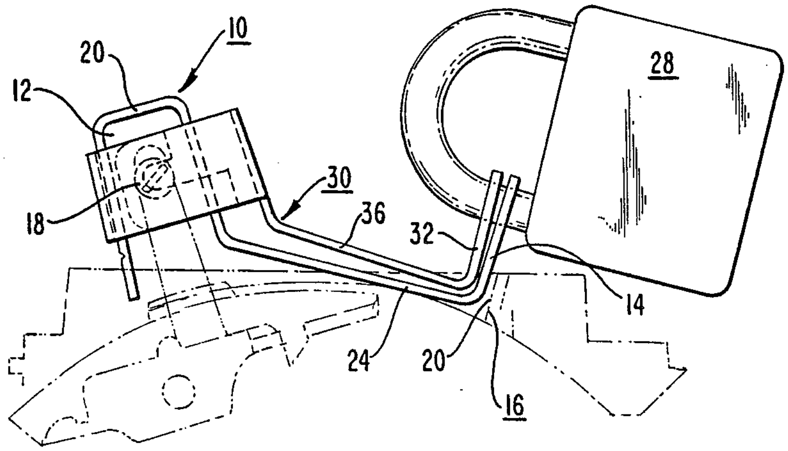
FIG. 4 illustrates the blocking member and the locking member, wherein the members are locked together.

In FIG. 4, the switch handle 12 is positioned in its OFF position and the blocking member 10 is positioned such that the switch handle 12 is prevented from moving to its ON position. To prevent removal of the blocking member 10 from the switch handle 12, a pivot member 30 is provided to restrict access to the screws 18. In the embodiments of the apparatus wherein the locking flange 14 is deflectable upward along ling A—A to permit movement of the handle 12, the pivot member 30 also cooperates with a lock 28 and the blocking member 10 to preent deflection of the locking flange 14 along A—A.

Figure 8:
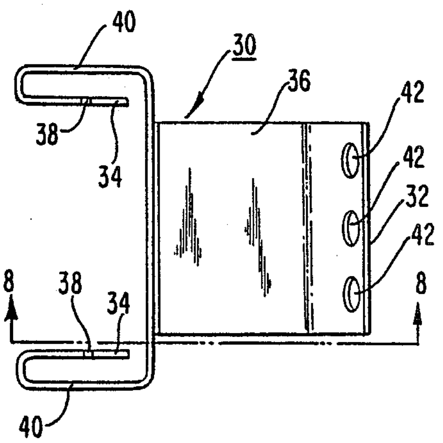
FIG. 8 is a top view of the locking member.
Figure 9:
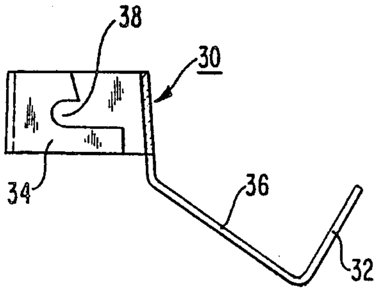
FIG. 9 is a side view of the locking member.

FIGS. 8 and 9 illustrate the pivot member 30 in more detail. The pivot member 30 includes a lock flange 32, a screw shielding and hooking member 34 and a member 36 for supporting the flange 32 relative to the member 34. By way of example, the blocking member 10 can be fabricated from a single blank stamped from 15 gauge cold rolled steel.

As with the locking flange 14, the lock flange 32 includes three holes 42 each adapted to accept a lock 28 for fixing the flange 14 relative to the flange 32. The screw shielding and hooking member 34 is fabricated such that a hooking portion 38 pivotally engages the screws 18. The member 34 also includes a shielding portion 40 which prevents access to the screws 18 when the switch handle 12 is locked in place.

Figure 5:
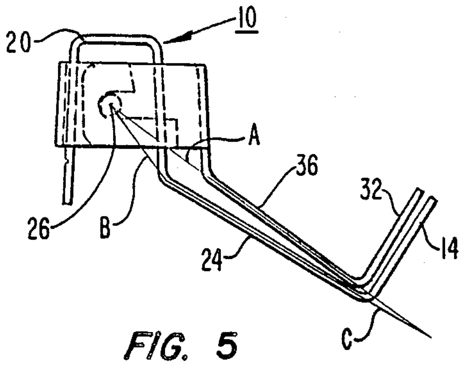
FIG. 5 illustrates the blocking member and the locking member arranged without the switch handle.

As discussed above, an embodiment of the blocking member 10 can be adapted to allow deflection of the locking flange 14 along line A—A. FIG. 5 illustrates the cooperation of the blocking member 10 and pivot member 30 which restricts the deflection of the blocking member 10 along line A—A. Without the pivot member 30, the member 24 can be pivoted at the hinge 25 or deformed such that the locking flange 14 is deflected upward along line A—A. When the pivot member 30 is positioned as shown in FIGS. 4 and 5 and a lock 28 is latched into the openings 42, a triangular force resisting configuration is formed, wherein the triangle falls on lines A, B, and C. In this configuration, the member 36 is put into compression and restricts the deflection of the locking flange 14 when an attempt is made to deflect the locking flange 14 for purposes of moving the switch handle 12.

While three embodiments of this invention have been shown and described in detail herein, various other changes and modifications may be made without departing from the scope of the present invention. For example, the components of the securing device could be mounted to the switch handle such that the switch handle is locked into the ON position.

We claim:

1. An apparatus for restricting the movement of a circuit breaker switch handle, wherein the circuit breaker is of the type including a housing and a switch handle movable between a first position and a second position, the apparatus comprising:

means adapted to interfere with the housing, the means adapted to interfere with the housing including a hooking member adapted to straddle the handle, and a locking flange adapted to interfere with the housing and accept a means for locking;

means for attaching the means adapted to interfere with the housing to the handle; and means for restricting access to the means for attaching, the means for restricting including an attachment member mountable to the handle, and a lock flange adapted to accept the means for locking;

wherein the means for locking may be coupled to the lock flange and the locking flange and the handle is restrained in the first position when the means adapted to interfere interferes with the housing.

2. The apparatus of claim 1, wherein the attachment member is pivotally mounted to the handle a plurality of screws, and wherein the hooking member includes a plurality of attachment flanges each attached to the handle by one screw.

3. The apparatus of claims 2, wherein the attachment member includes a plurality of shielding members adapted to restrict removal of the screws.

4. The apparatus of claim 3 wherein the means for locking is a padlock.

5. An apparatus useable with a means for locking, the apparatus restricting the movement of a circuit breaker switch handle, wherein the circuit breaker is of the type including a housing and a switch handle movable between a first position and a second position, the apparatus comprising: means for attaching;

a pivot member including an attachment member mountable to the handle with the means for attaching and a lock flange adapted to accept the means for locking; and a blocking member mountable to the handle with the means for attaching, the blocking member including a hooking member adapted to straddle the handle and a locking flange adapted to interfere with the housing and accept the means for locking, wherein the locking means may be coupled to the lock flange and the locking flange, the handle is restrained in the first position when the locking flange interferes with the housing, and the pivot member restricts access to the means for attaching.

6. The apparatus of claims 5, wherein the attachment member includes a plurality of shielding members adapted to restrict removal access to the means for attaching.

7. The apparatus of claim 6, wherein means for attaching comprises a plurality of screws.

8. The apparatus of claim 7 wherein the means for locking is a padlock.

* * * * *